Figure 7:
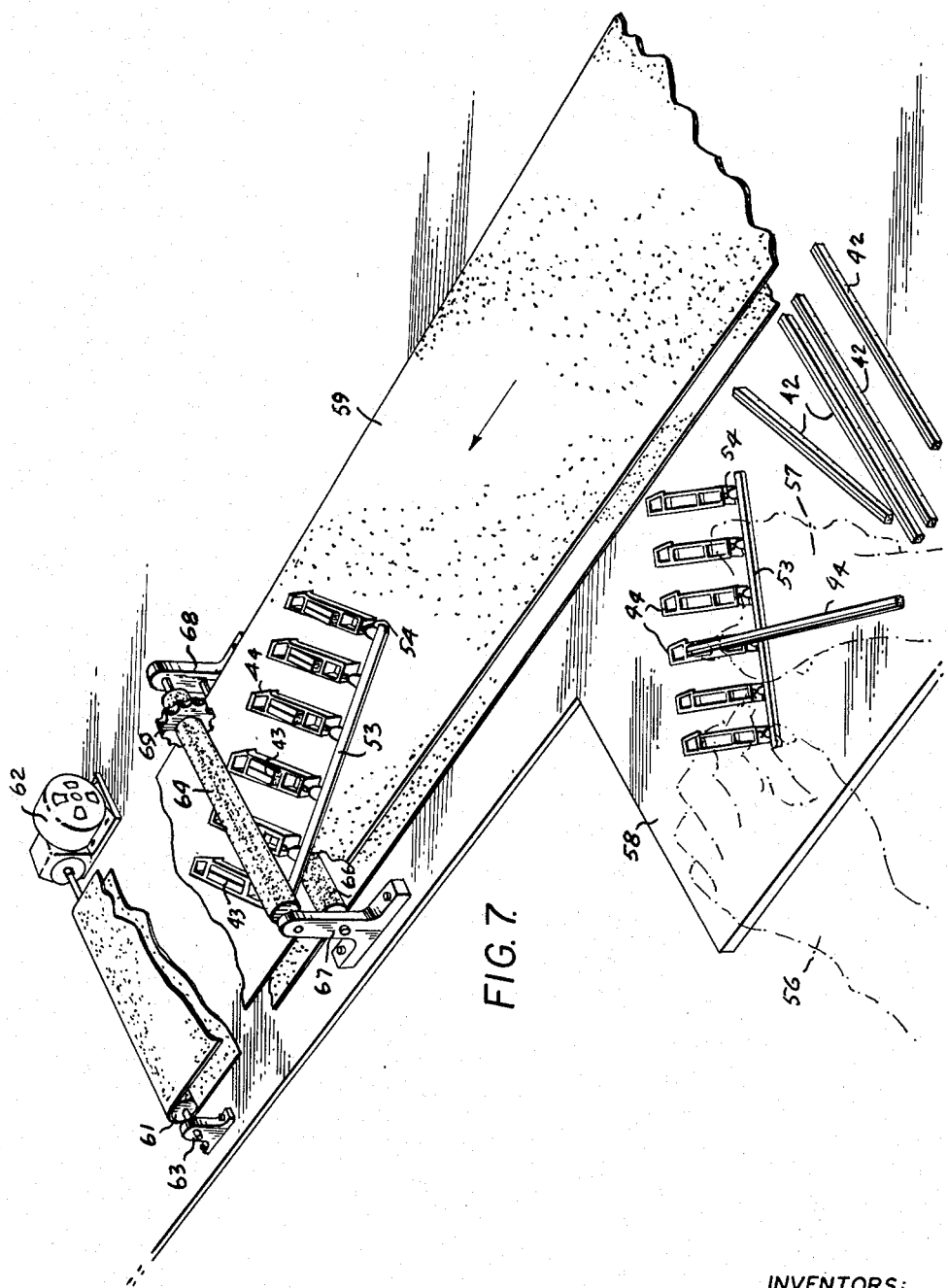

June 22, 1965  R. I. GENIN ETAL  3,189,981
METHOD OF ASSEMBLING MAGNETIZED RUBBER-LIKE
STRIPS IN PLASTIC CONFIGURATIONS
Filed May 25, 1961  3 Sheets-Sheet 1
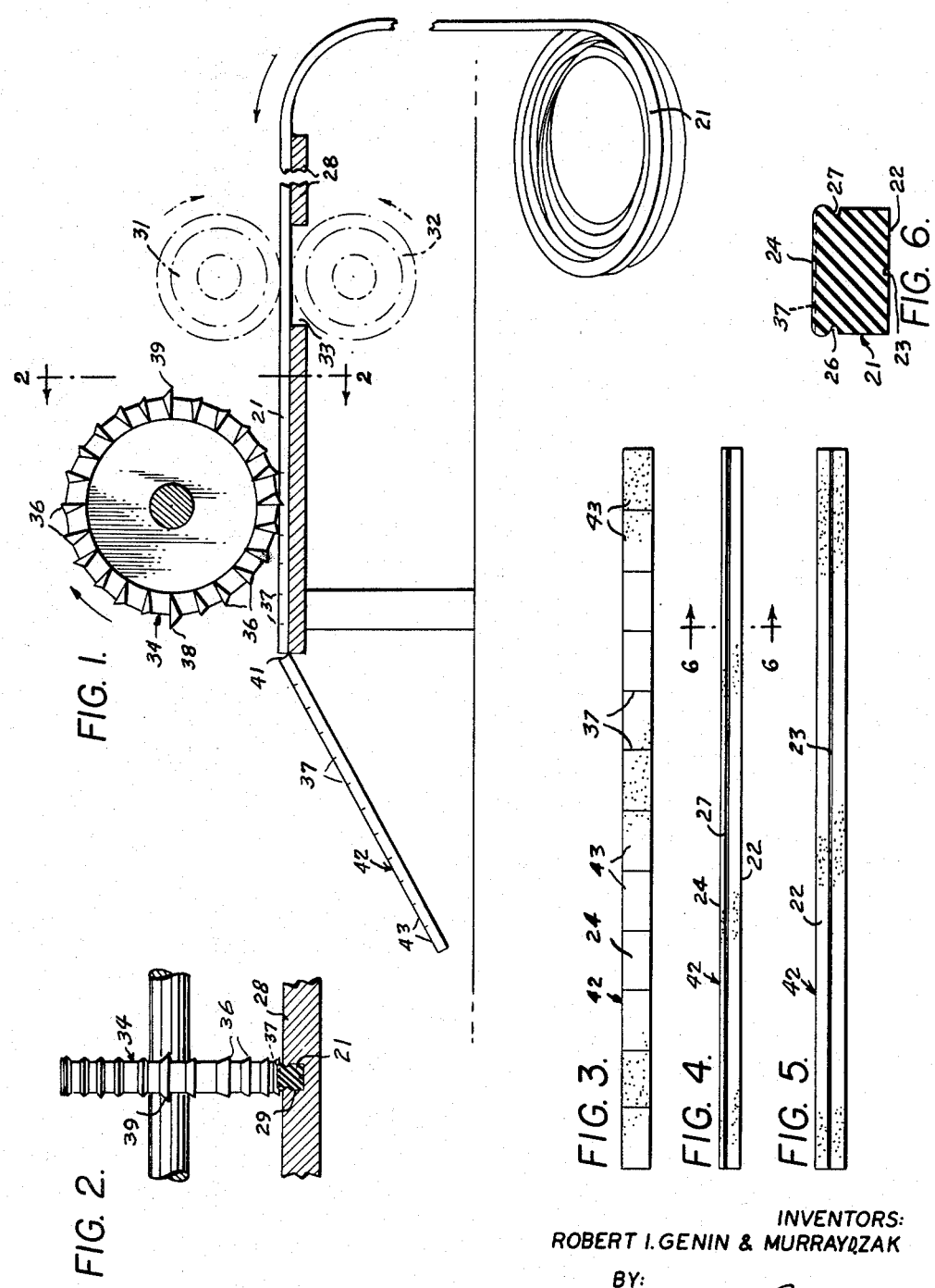
INVENTORS:
ROBERT I. GENIN & MURRAY DZAK
BY:
L. S. Saulsbury
ATTORNEY INVENTORS:
ROBERT I. GENIN & MURRAY D ZAK
BY:
L. S. Saulsbury
ATTORNEY.

June 22, 1965 R. I. GENIN ETAL 3,189,981
METHOD OF ASSEMBLING MAGNETIZED RUBBER-LIKE
STRIPS IN PLASTIC CONFIGURATIONS
Filed May 25, 1961 3 Sheets-Sheet 3
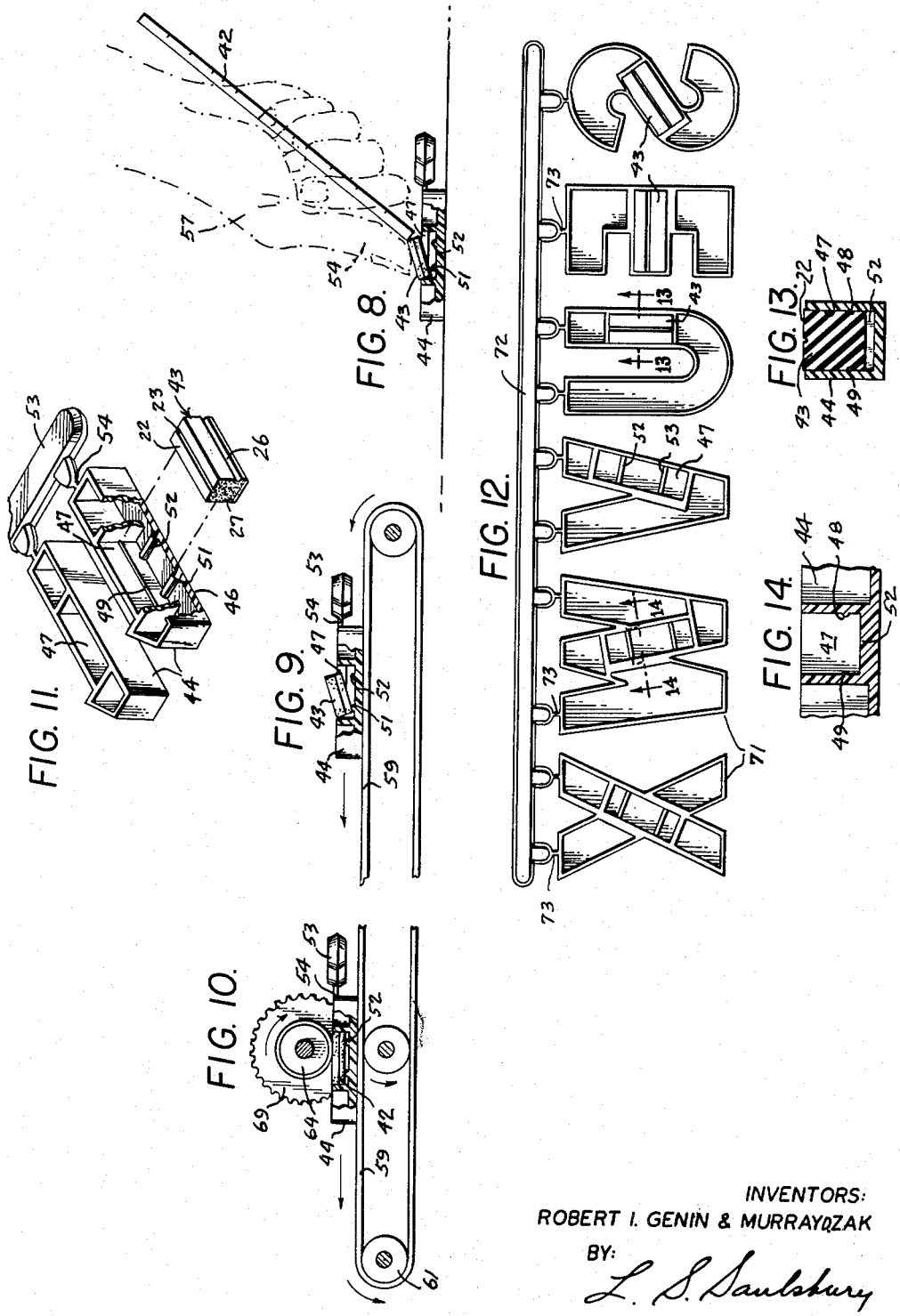
INVENTORS:
ROBERT I. GENIN & MURRAY QZAK
BY:
L. S. Saulsbury
ATTORNEY

United States Patent Office 3,189,981
Patented June 22, 1965

3,189,981
METHOD OF ASSEMBLING MAGNETIZED RUBBER-LIKE STRIPS IN PLASTIC CONFIGURATIONS
Robert I. Genin, New Rochelle, and Murray D. Zak, Plainview, N.Y., assignors to Child Guidance Toys, Inc., Bronx, N.Y., a corporation of New York
Filed May 25, 1961, Ser. No. 112,725
2 Claims. (Cl. 29—155.59)

This invention relates to a method of preparing and assembling a magnetized rubber-like strip into plastic configurations, the term configuration is herein used meaning a numeral, letter, or outline design of an object or article, preferably hollow and having a closed top, a peripheral wall and an open bottom.

It is the principal object of the present invention to provide a method of assembling uniformly sized rubber-like magnets into preformed uniformly sized and shaped wells within the hollow interior of plastic configurations which will ease the work of the assembler, increase the rate of production and reduce production costs.

It is another object of the invention to provide in the method of assembling magnetized rubber-like strips, a simple way of preparing and sizing the magnetic pieces which are used respectively in the respective plastic configurations from a continuous roll of the strip material and severing the strip material into piece lengths which are easy to handle and manipulate while being placed in the wells of the configurations by the assembler.

It is still another object of the invention to provide magnetized rubber-like strips of a cross sectional shape especially grooved to be received and retained between opposing parallel ribbed walls of uniformly sized preformed assembly wells within configurations so that the method of assembly includes expanding the side walls and the seating of the magnetized rubber piece into the wells in a snap-in manner, and wherein the final assembly, once the magnetized piece has been started in the well by the assembler, is effected by a pressure roll and without further exertion on the part of the assembler to seat the magnet piece within the well of the configuration, the assembler merely needing to locate, start and break off the magnet pieces within the wells.

It is a further object of the invention to provide a method of assembling magnets into the wells of such configurations in which the magnetized rubber-like strip piece is of a length such that as the individual magnets are broken off by pressure of the thumb at a weakened location on the strip length a sufficient length remains in the hand to stay rigid allowing thereby a supply of several magnetic strips to be easily contained in the hand of the assembler in a comfortable manner and in a position to be easily fed into the wells thereby rendering changing of the position of the fingers unnecessary, as in reaching for individual magnets.

Other objects of the invention are to provide a method of assembly of magnetized rubber-like strips or magnets into preformed uniformly sized wells of plastic or metallic configurations such as letters, numbers or designs employed in signs or in the playing of a game, which can be carried out in a simple and expeditious manner, with little effort and minimum by a simple down thrust of the hand while the configurations travel along a conveyor, which is readily adapted to mass production and wherein the markings for giving indication as to the proper use of the strip lengths are made upon the piece lengths when the same are prepared in the form of scorings at which the piece length is to be broken into short well-sized magnets.

The method of the instant invention is of particular utility in the formation of letters, numerals and other configurations which are magnetically secured to a metal game board or background for the purpose of playing a word or letter game, for forming replaceable signs, and for other similar purposes involving configurations including magnetized rubber-like material.

For a better understanding of the proposed assembly method reference may be had to the following detailed description taken in connection with the accompanying drawings, in which:

FIGURE 1 is a diagrammatic elevational view illustrating how the soft rubber-like magnetized roll of strip material is scored and weakened and broken into assembly piece lengths, FIG. 2 is a vertical sectional view of the strip scoring and severing arrangement as viewed on line 2—2 of FIG. 1, FIGS. 3, 4 and 5 are respectively top, side and bottom views of the magnetized severed piece lengths which the assembler uses to place and break off the individual magnets in the configuration's well.

FIG. 6 is an enlarged transverse sectional view of the magnetized rubber-like breakable piece length as viewed on line 6—6 of FIG. 4, FIG. 7 is a fragmentary top perspective view of the assembling conveyor with illustration being made at the assembler's station of the initial or starting assembling of the magnetized strip pieces into the configurations and the final step of rolling the magnetic pieces home therewithin while being conveyed along the conveyor, FIG. 8 is a fragmentary elevational view of one of the configurations broken away and with illustration being made in detail as to how the thumb while retaining the piece length in the hand applies the initial pressure to effect the mere start and location of the magnetized strip in the well of the configuration, FIG. 9 is a similar fragmentary elevational view of the configuration with the magnetic piece started thereon and being conveyed, FIG. 10 is a fragmentary elevational view of the configuration passing under the pressure roll and the rubber-like magnet having been squeezed and snapped home within the well of the configuration.

FIG. 11 is a perspective view of two plastic configurations held together by their molding scrap and one of the configurations broken away and the magnets separated therefrom to show the interior well shape, FIG. 12 is a bottom plan view of a collection of miscellaneous letter configurations still united by their mold scrap, some of the same having been filled with the magnetic pieces and the others yet unfilled, FIG. 13 is an enlarged cross sectional view of one of the magnet filled configurations and as viewed on line 13—13 of FIG. 12, and FIG. 14 is an enlarged cross sectional view of one of the unfilled letter configurations as viewed on line 14—14 of FIG. 12.

Referring now particularly to FIGS. 1 to 6, 21 represents a roll of magnetized rubber-like strip extruded at the supply source in continuous strips of one hundred feet or more in length. The material while bendable sufficiently to be coiled with large diameter will break or shear when taken in two hands and bent as one would break a stick. The size in width and section in relation to the human hand is disclosed in FIG. 8. Throughout the mass and particularly on the bottom face 22 magnetizable material in the form of pulverized metal has been extruded with embedded and impregnated in and adjacent to in particular, the bottom face 22 and separated by a longitudinally running central groove 23 to provide a magnet of divided portions of opposite polarity to complete a magnetic circuit when the magnetic strip is placed upon a magnetizable surface alone, or with a plastic configuration attached thereto in a manner and according to the method of assembly soon to be set forth herein.

The continuous strip 21 will, as well as having the continuous bottom groove 23, when extruded, have nearer to its top face 24, side mounting grooves 26 and 27 serving to hold the magnet pieces in the uniformly sized and shaped wells of the various configurations in a manner that will also soon become apparent as the description proceeds.

The continuous strip 21 from its roll is fed over a table 28 and through a guide slot 29 in the top surface thereof by opposing drive rollers 31 and 32 acting respectively upon the top and bottom sides of the magnetized strip with the feed roll 32 moving along a slot 33 in the table, and by a scoring and cut off roll 34 having eleven score cutting edges 36 engaging with the top surface 24 of the strip material to partially sever the strip material to provide scorings 37 on its top surface, and to effect a full severance of the strip material by means of longer knives 38 and 39 to separate, as indicated at 41, the continuous strip into usable long lengths 42 such as can be readily grasped in the hand as illustrated in FIG. 8, from which individual rubber-like magnets 43 are broken. The cut off roll 34 has two series of these short score cutting edges 36, each series being at diametrically opposite sides of a diameter extended through the longer severing knives 38 and 39. The depths of the scorings 37 are slight and best illustrated in FIG. 6. The material is sufficiently brittle so that the lengths 42 break evenly and readily when the pressure with the thumb is applied as illustrated in FIG. 8. By providing the scorings in the material, the magnets 42 will always be of the same short length, there being twelve such magnets 43 in each hand length 42.

As shown in FIGS. 7 through 11, configurations 44 are such as will portray a numeral "1" but, of course, can be of other numerals or configurations. This numeral 44 is hollow and has a closed top display face 46 and an open bottom having a well of predetermined size and shape 47 into which a small plastic magnet 43 is placed. These configurations 44 are preferably formed of plastic such as polyethylene and the side walls of the well 47 can give or expand slightly on being filled with the magnet 43 so as to allow top side 24 of the magnet to pass opposing side ribs 48 and 49 which are adapted to snap into grooves 26 and 27 so as to retain the magnet 43 within the well 47. When the magnet is disposed in the well it rests on spaced ribs 51 and 52 extending upwardly from the inverted underside of the top 46 of the numeral which measures the distance of insertion of the magnet, and to allow the deformable material of the magnet to accommodate itself to the well sides and its respective grooves 26 and 27 to the respective ribs 48 and 49. A series of the configurations may be kept together as a unit while being filled with the magnets, by mold scrap 53 which can be broken off at the small connections 54.

In assembling the individual magnets 43 in the wells 47 of the set of numerals 44, an assembler whose hands are indicated at 56 and 57 works at an assembly station 58 with a conveyor belt 59 traveling in front of the station 58 and driven by a drive roll or wheel 61 powered from a motor driven reduction gear unit 62. The unit 62 supports the roller 61 at one side and a journal bearing 63 supports the roller 61 at the opposite side.

The assembler grasps the relatively brittle magnetized rubber-like length 47 as best illustrated in FIG. 8 with the bottom face 22 up and proceeds to use pressure with thumb 54 to start a magnet 43 in a well 47, using only enough pressure so as to engage one end of the magnet in the well 47 with the side ribs 48 and 49 engaging the sides of the magnet 43. This is done to a strip of, say, six numerals 44 fastened to mold scrap 53, as shown upon the assembler station 58 in FIG. 7. This can be done quickly and easily by the assembler and the entire strip of numerals 44 is placed upon the belt 59 and allowed to pass under a top pressure roll 64 while the conveyor belt 59 is supported upon a bottom pressure roll 66. These rolls are held in vertically spaced relationship in journal bearing brackets 67 and 68 so that the top pressure roll 64 is kept at the speed of the conveyor 59. A toothed drive ring 69 is carried on the roller 64 and engages with the conveyor belt 59. The magnets 43 are thereby pressed or stamped home from the positions shown in FIG. 8 or 9 to the positions best shown in FIGS. 10 and 13. The side walls of the well 47 yield or expand outwardly to allow the ribs 48 and 49 to enter and snap into the grooves 26 and 27 firmly to retain the magnets within the wells of the numeral configurations.

It should be apparent that even length magnets are broken from the strip lengths 42 only at the time of assembly and thus by the avoidance of having loose single pieces there is little chance for fumbling the magnets and the entire assembly operation is effected in an expeditious and speedy manner.

Instead of numerals, letter configurations 71 may be formed with a mold scrap 72 having thin and breakable connections 73 as shown in FIG. 12. These letter units are provided with wells 47 of the same size and configurations as the wells in numerals 44 and the magnets are placed therein in the same manner as above described at the assembler's station 58. The units are then placed upon the conveyor 59 and run between the pressure rolls 64 and 66. After the numerals or letters have been passed through the pressure rolls they can be assembled with the mold scraps still intact or the mold scrap removed by simply breaking off therefrom the numerals or letters. These letters and numerals may be packaged with a metal game board, including an alphabet or two, and with sets of numerals. Words and numbers can be built upon the metal game board surface, such numerals and numbers being held in place and aligned with one another by their magnets. Alternatively, the numerals and letters may be used to form a sign or signs on a metal background.

While various detail changes may be made in the carrying out of this method of assembly, it shall be understood that such slight changes shall be within the spirit and scope of the present invention as defined by the appended claims.

What is claimed is:

1. A method of forming magnetic configurations which comprises the steps of simultaneously molding a plurality of outline configurations having marginal outlines, closed tops and open bottoms, and simultaneously molding integral wells of uniform size and shape interiorly of each configuration and open at the bottom of the configuration, simultaneously forming horizontal ribs along the sides of each well and transverse ribs along the underside of the top of the configuration within the well, the sides of the well being slightly expandable, said configurations being connected as a unit by integral mold scrap, preparing a roll of an elongated strip of magnetized relatively brittle rubber-like material having grooves in the opposite sides thereof and of a thickness less than the depth of a well and a width slightly in excess of the width of a well, scoring the material at spaced points to provide break lines for individual magnets of a length substantially equal to the length of the well, severing the elongated strip at predetermined intervals to form readily handled lengths comprised of a plurality of individual magnet lengths, inverting the unit comprised of the plurality of molded configurations still connected by mold scrap on a work surface, grasping a number of the lengths of individual magnets in the hand, with the break lines uppermost, inserting an end of the length into a well slightly separating the side walls thereof, breaking off the end individual magnet having its end in the well at the score line, repeating the process until all the wells of the connected configurations are filled, passing the unit comprising the connected configurations between pressure rolls to complete the seating of the individual magnets in the individual wells, wtih the bases of the magnets seating on the ribs formed on the underside of the configurations and the tops of the magnets being flush with the tops of the walls of the well, and the horizontal ribs of the side walls of the wells fitting into the grooves in the sides of the magnet, and finally breaking the completed configurations from the mold scrap.

2. A method of forming magnetic configurations which comprises the steps of molding a plurality of outline configurations having marginal outlines, closed tops and open bottoms, and simultaneously molding integral wells of uniform size and shape interiorly of each configuration and open at the bottom of the configuration, simultaneously forming horizontal ribs along the sides of each well and transverse ribs along the underside of the top of the configuration within the well, the sides of the well being slightly expansible, preparing a roll of an elongated strip of magnetized relatively brittle rubber-like material having grooves in the opposite sides thereof and of a thickness less than the depth of a well and a width slightly in excess of the width of a well, scoring the material at spaced points to provide break lines for individual magnets of a length substantially equal to the length of the well, severing the elongated strip at predetermined intervals to form readily handled lengths comprised of a plurality of individual magnet lengths, inverting a plurality of molded configurations on a work surface, grasping a number of the lengths of individual magnets in the hand, with the break lines uppermost, inserting an end of the length into a well slightly separating the side walls thereof, breaking off the end individual magnet having its end in the well at the score line, repeating the process until all the wells of the configurations are filled, and passing the configurations between pressure rolls to complete the seating of the individual magnets in the individual wells, with the bases of the magnets seating on the ribs formed on the underside of the configurations and the tops of the magnets being flush with the tops of the walls of the well, and the horizontal ribs of the side walls of the wells fitting into the grooves in the sides of the magnet.

References Cited by the Examiner

UNITED STATES PATENTS

| | | | |
|---|---|---|---|
| 800,721 | 10/05 | Coolidge | 40—142 |
| 1,735,883 | 11/29 | Smith | 40—142 |
| 2,068,035 | 1/37 | Meyer | 29—450 |
| 2,192,667 | 3/40 | Smith | 273—131 X |
| 2,459,568 | 1/49 | Lyon | 29—413 |
| 2,564,502 | 8/51 | Radford | 273—137 X |
| 2,687,305 | 8/54 | Wales | 273—136 X |
| 2,756,172 | 7/56 | Kidd | 29—453 |
| 2,819,904 | 1/58 | Nelson et al. | 273—136 X |
| 2,846,831 | 8/58 | Dobbins | 29—453 |
| 2,878,023 | 3/59 | Decepoli | 273—128 X |
| 2,915,812 | 12/59 | Rettinger | 29—155.59 |
| 2,949,663 | 8/60 | Perry | 29—155.59 |
| 2,951,703 | 9/60 | Arnold | 273—136 X |
| 2,958,019 | 10/60 | Scholten et al. | 317—159 |
| 3,034,025 | 5/62 | Budreck et al. | 317—159 |
| 3,068,939 | 12/62 | Commisso | 29—453 |

FOREIGN PATENTS

| | | |
|---|---|---|
| 67,721 | 4/44 | Norway. |
| 657,562 | 9/51 | Great Britain. |

OTHER REFERENCES

What You Can Do With Flexible Magnets, Product Engineering, pp. 65–68, January 9, 1961.

WHITMORE A. WILTZ, *Primary Examiner.*

S. BERNSTEIN, JOHN F. CAMPBELL, *Examiners.*